May 27, 1958 — E. FERMI ET AL — 2,836,554
AIR COOLED NEUTRONIC REACTOR
Filed May 29, 1945 — 7 Sheets-Sheet 1

FIG.1.

Inventors:
Enrico Fermi
Leo Szilard

May 27, 1958 E. FERMI ET AL 2,836,554
AIR COOLED NEUTRONIC REACTOR
Filed May 29, 1945 7 Sheets-Sheet 5

Witnesses:

Inventors:
Enrico Fermi
Leo Szilard
By:
Attorney

May 27, 1958     E. FERMI ET AL     2,836,554
AIR COOLED NEUTRONIC REACTOR
Filed May 29, 1945     7 Sheets-Sheet 6

Inventors:
Enrico Fermi
Leo Szilard

United States Patent Office 2,836,554
Patented May 27, 1958

2,836,554

AIR COOLED NEUTRONIC REACTOR

Enrico Fermi, Santa Fe, N. Mex., and Leo Szilard, Chicago, Ill., assignors to the United States of America as represented by the United States Atomic Energy Commission Application May 29, 1945, Serial No. 596,465

3 Claims. (Cl. 204—193.2)

The present invention relates to a neutronic reactor which is capable of numerous uses but is particularly adapted to use for the production of the transuranic element $94^{239}$ and/or radioactive fission products by neutrons released during a self-sustaining nuclear chain reaction through fission of uranium with slow neutrons. More particularly, our invention relates to the removal of the heat of the neutronic reaction to such an extent that the reaction may be conducted at a more rapid rate and the production of element $94^{239}$ and/or fission products may be accelerated. Natural uranium may be used in the reaction and contains the isotopes $92^{238}$ and $92^{235}$ in the ratio of approximately 139 to 1. Hereinafter in the specification and the claims the term uranium is to be understood as referring to uranium and its chemical compositions of normal isotopic content or equivalent compositions, unless otherwise indicated by the context.

When it became known that the isotope $U^{235}$ in natural uranium could be split or fissioned by bombardment with thermal neutrons, i. e., neutrons at or near thermal equilibrium with the surrounding medium, many predictions were made as to the possibility of obtaining a self-sustaining chain reacting system operating at high neutron densities. In such a system, the fission neutrons produced give rise to new fission neutrons in sufficiently large numbers to overcome the neutron losses in the system. Since the result of the fission of the uranium nucleus is the production of two lighter elements with great kinetic energy, plus approximately 2 fast neutrons on the average for each fission along with beta and gamma radiation, a large amount of power can be made available in a self-sustaining system.

It has been found that most of the neutrons arising from the fission process are set free with the very high energy of the order of one million electron volts and are therefore not immediately in condition to be utilized efficiently to create new thermal neutron fissions in $U^{235}$ when it is mixed with a considerable quantity of $U^{238}$, as is the case with natural uranium. The energies of the fission-released neutrons are so high that most of the latter would tend to be absorbed by the $U^{238}$ nuclei, and yet the energies are not generally high enough for production of fission by more than a small fraction of the neutrons so absorbed. For neutrons of thermal energies, however, the absorption cross section of $U^{235}$, to produce fission, rises a great deal more than the simple capture cross section of $U^{238}$; so that under the stated circumstances the fast fission neutrons, after they are created, must be slowed down to thermal energies before they are most effective to produce fresh fission by reaction with additional $U^{235}$ atoms. When a system larger than critical size is made in which neutrons are slowed down without much absorption until they reach thermal energies and then mostly enter into uranium rather than into any other element, a self-sustaining nuclear chain reaction is obtained, even with natural uranium. Light elements, such as deuterium, beryllium, oxygen or carbon, the latter in the form of graphite, can be used as slowing agents or neutron moderators. A special advantage of the use of the light elements mentioned for slowing down fast fission neutrons is that fewer collisions are required for slowing than is the case with heavier elements, and furthermore, the above-enumerated elements have very small neutron capture probabilities, even for thermal neutrons. Hydrogen would be most advantageous were it not for the fact that there may be a relatively high probability of neutron capture by the hydrogen nucleus. Carbon in the form of graphite is a relatively inexpensive, practical, and readily available agent for slowing fast neutrons to thermal energies. Recently, beryllium has been made available in sufficiently large quantities for test as to suitability for use as a neutron slowing material in a system of the type to be described. It has been found to be in every way as satisfactory as carbon. Deuterium compounds such as deuterium oxide while more expensive are even more satisfactory.

However, in order for the premise to be fulfilled that the fast fission neutrons be slowed to thermal energies in a slowing medium without too large an absorption in the $U^{238}$ isotope of the uranium, certain types of physical structure are utilized for the most efficient reproduction of neutrons, as precautions must be taken to reduce various neutron losses and thus to conserve neutrons for the chain reaction if a self-sustaining system is to be attained.

An initial number of fast neutrons in the system by going through the process of absorption and fission reproduces in the next generation a number of neutrons generally different from the initial number. The ratio of the number produced after one generation to the initial number for a system of infinite size is called the reproduction or multiplication factor of the system and is denoted by the symbol K. If K can be made sufficiently greater than unity to create a net gain in neutrons for the system of infinite size and the system made smaller but still sufficiently large so that this gain is not entirely lost by leakage from the exterior surface of the system, then a self-sustaining chain reacting system can be built to produce power (in the form of heat) by nuclear fission of natural uranium. The neutron reproduction ratio in a system of finite size differs from K by the leakage factor (neutrons lost from the system through leakage), and must be sufficiently greater than unity to permit the neutron density to rise exponentially. Such a rise will continue indefinitely if not controlled at a desired density corresponding to a desired power output.

During the interchange of neutrons in a system comprising bodies of uranium of any size in a slowing medium, neutrons may be lost in four ways, by absorption in the uranium metal or compound without producing fission, by absorption in the slowing down material, by absorption in impurities present in the system, and by leakage from the system. These losses will be considered in the order mentioned.

Natural uranium, particularly by reason of its $U^{238}$ content, has an especially strong absorbing power for neutrons when they have been slowed down to moderate energies. The absorption in uranium at these energies is termed the uranium resonance absorption or capture. It is caused by the isotope $U^{238}$ and does not result in fission but creates the isotope $U^{239}$ which by two successive beta emissions forms the relatively stable nucleus $94^{239}$. It is not to be confused with absorption or capture of neutrons by impurities referred to later. Neutron resonance absorption in uranium may take place either on the surface of the uranium bodies, in which case the absorption is known as surface resonance absorption, or it may take place further in the interior of the uranium body, in which case the absorption is known as volume resonance absorption. It will be appreciated that this classification of resonance absorptions is merely a convenient characterization of observed phenomena, and arises, not because the neutron absorbing power of a $U^{238}$ nucleus is any greater when the nucleus is at the surface of a body of metallic, or combined uranium, but because the absorbing power of $U^{238}$ nuclei for neutrons of certain particular energies is inherently so high that practically all neutrons that already happen to have those energies, called resonance energies as explained above, are absorbed almost immediately upon their arrival in the body of uranium metal or uranium compound, and thus in effect are absorbed at the surface of such body. Volume resonance absorption is due to the fact that some neutrons make collisions inside the uranium body and may thus arrive at resonance energies therein. After successfully reaching thermal velocities, about 40 percent of the neutrons are also subject to capture by $U^{238}$ without fission, to produce $U^{239}$ and eventually $94^{239}$.

It is possible, by proper physical arrangement of the materials, to reduce substantially uranium resonance absorption. By the use of light elements as described above for neutron moderators, a relatively large increment of energy loss is achieved in each collision and therefore fewer collisions are required to slow the neutrons to thermal energies, thus decreasing the probability of a neutron being at a resonance energy as it enters a uranium atom. During the slowing process, however, neutrons are diffusing through the slowing medium over random paths and distances so that the uranium is not only exposed to thermal neutrons but also to neutrons of energies varying between the emission energy of fission and thermal energy. Neutrons at uranium resonance energies will, if they enter uranium at these energies, be absorbed on the surface of a uranium body whatever its size, giving rise to surface absorption. Any substantial reduction of overall surface of the same amount of uranium relative to the amount of moderator (i. e. the amount of moderator remaining unchanged) will reduce surface absorption, and any such reduction in surface absorption will release neutrons to enter directly into the chain reaction, i. e., will increase the number of neutrons available for further slowing, and thus for reaction with $U^{235}$ to produce fission.

For a given ratio of moderator to uranium, surface resonance absorption losses of neutrons in the uranium can be reduced by a large factor from the losses occurring in a mixture of fine uranium particles and a slowing medium, when the uranium is aggregated into substantial masses in which the mean spatial radius is at least 0.25 centimeter for natural uranium metal and when the mean spatial radius of the bodies is at least 0.75 centimeter for the oxide of natural uranium ($UO_2$). An important gain is thus made in the number of neutrons made directly available for the chain reaction. A similar gain is made when the uranium has more than the natural content of fissionable material. Consequently, the uranium is placed in the system in the form of spaced uranium masses or bodies of substantial size, preferably either of metal, oxide, carbide, or combinations thereof. The uranium bodies can be in the form of layers, rods or cylinders, cubes or spheres, or approximate shapes, dispersed throughout the graphite, preferably in some geometric pattern. The term geometric is used to mean any pattern or arrangement wherein the uranium bodies are distributed in the graphite or other moderator with at least either a roughly uniform spacing or with a roughly systematic non-uniform spacing, and are at least roughly uniform in size and shape or are systematic in variations of size or shape to produce a volume pattern conforming to a roughly symmetrical system. If the pattern is a repeating or rather exactly regular one, a system embodying it may be conveniently described as a lattice structure. Optimum conditions are obtained with natural uranium by using a lattice of metal spheres.

The number of neutrons made directly available to the chain reaction by aggregating the uranium into separate bodies spaced through the slowing medium is a critical factor in obtaining a self-sustaining chain reaction utilizing natural uranium and graphite. The K factor of a mixture of fine uranium particles in graphite, assuming both of them to be theoretically pure, would only be about .785. Actual K factors as high as 1.07 have been obtained using aggregation of natural uranium in the best known geometry, and with as pure materials as it is presently possible to obtain.

Assuming theoretically pure carbon and theoretically pure natural uranium metal, both of the highest obtainable densities, the maximum possible K factor theoretically obtainable is about 1.1 when the uranium is aggregated with optimum geometry. Moreover when beryllium is used as the moderator, a K factor as high as 1.18 is obtainable and if $D_2O$ is used a K factor of about 1.3 may be secured with pure materials. Still higher K factors can be obtained by the use of aggregation in the case of uranium having more than the naturally occurring content of fissionable materials such as $U^{233}$, $U^{235}$ or $94^{239}$. Adding such fissionable material is termed enrichment of the uranium.

It is thus clearly apparent that the aggregation of the uranium into masses separated in the slowing material is one of the most important, if not the most important factor entering into the successful construction of a self-sustaining chain reacting system utilizing relatively pure natural uranium in a slowing material in the best geometry at present known, and is also important in obtaining high K factors when enrichment of the uranium is used.

The thermal neutrons are also subject to capture by the slowing material. While carbon and beryllium have very small capture cross sections for thermal neutrons, and deuterium still smaller, an appreciable fraction of thermal neutrons (about 10 percent of the neutrons present in the system under best conditions with graphite) is lost by capture in the slowing material during diffusion therethrough. It is therefore desirable to have the neutrons reaching thermal energy promptly enter uranium.

In addition to the above-mentioned losses, which are inherently a part of the nuclear chain reaction process, impurities present in both the slowing material and the uranium add a very important neutron loss factor in the chain. The effectiveness of various elements as neutron absorbers varies tremendously. Certain elements such as boron, cadmium, samarium, gadolinium, and some others, if present even in a few parts per million, could prevent a self-sustaining chain reaction from taking place. It is highly important, therefore, to remove as far as possible all impurities capturing neutrons to the detriment of the chain reaction from both the slowing material and the uranium. If these impurities, solid, liquid, or gaseous, and in elemental or combined form, are present in too great quantity, in the uranium bodies or the slowing material or in, or by absorption from, the free spaces of the system, the self-sustaining chain reaction cannot be attained. The amounts of impurities that may be permitted in a system, vary with a number of factors, such as the specific geometry of the system, and the form in which the uranium is used—that is, whether natural or enriched, whether as metal or oxide—and also factors such as the weight ratios between the uranium and the slowing down material, and the type of slowing down or moderating material used—for example, whether deuterium, graphite or beryllium. Although all of these considerations influence the actual permissible amount of each impurity material, it has fortunately been found that, in general, the effect of any given impurity or impurities can be correlated directly with the weight of the impurity present and with the K factor of the system, so that knowing the K factor for a given geometry and composition, the permissible amounts of particular impurities can be readily computed without taking individual account of the specific considerations named above. Different impurities are found to effect the operation to widely different extents; for example, relatively considerable quantities of elements such as hydrogen may be present, and, as previously suggested, the uranium may be in the form of oxide, such as $UO_2$ or $U_3O_8$, or carbide, although the metal is preferred. Nitrogen may be present to some extent, and its effect on the chain reaction is such that the neutron reproduction ratio of the system may be changed by changes in atmospheric pressure. This effect may be eliminated by enclosing or evacuating the system if desired. In general, the inclusion of combined nitrogen is to be avoided.

The effect of impurities on the optimum reproduction factor K may be conveniently evaluated to a good approximation, simply by means of certain constants known as "danger coefficients" which are assigned to the various elements. These danger coefficients for the impurities are each multiplied by the percent by weight of the corresponding impurity, and the total sum of these products gives a value known as the total danger sum. This total danger sum is subtracted from the reproduction factor K as calculated for pure materials and for the specific geometry under consideration.

The danger coefficients are defined in terms of the ratio of the weight of impurity per unit mass of uranium and are based on the cross section for absorption of thermal neutrons of the various elements. These values may be obtained from physics textbooks on the subject and the danger coefficient computed by the formula $$\frac{\sigma_i}{\sigma_u} \frac{A_u}{A_i}$$

wherein $\sigma i$ represents the cross section for the impurity and $\sigma u$ the cross section for the uranium, $A_i$ the atomic weight of the impurity and $A_u$ the atomic weight for uranium. If the impurities are in the carbon, they are computed as their percent of the weight of the uranium of the system.

Presently known values for danger coefficients for some elements are given in the following table, wherein the elements are assumed to have their natural isotopic constitution unless otherwise indicated, and are conveniently listed according to their chemical symbols:

| Element | Danger Coefficient | Element | Danger Coefficient |
|---|---|---|---|
| He | 0 | Cu | 1.8 |
| Li | 310 | Zn | 0.61 |
| B | 2,150 | Ga | ~1 |
| N | 4.0 | As | 2 |
| F | 0.02 | Se | 6.3 |
| Na | 0.65 | Br | 2.5 |
| Mg | 0.48 | Rh | 50 |
| Al | 0.30 | Ag | 18 |
| Si | 0.26 | Cd | 870 |
| P | 0.3 | In | 54.2 |
| S | 0.46 | Sn | 0.18 |
| Cl | 31 | Sb | 1.6 |
| K | 2.1 | I | 1.6 |
| Ca | 0.37 | Ba | 0.30 |
| Ti | 3.8 | Sm | ~1,430 |
| V | 4 | Eu | 435 |
| Cr | 2 | Gd | ~6,320 |
| Mn | 7.5 | Pb | 0.03 |
| Fe | 1.5 | Bi | 0.0025 |
| Co | 17 | Th | 1.1 |
| Ni | 3 | | |

Where an element is necessarily used in an active part of a system, it is still to be considered as an impurity; for example, in a structure where the uranium bodies consist of uranium oxide, the actual factor K would ordinarily be computed by taking that fact into account using as a base K a value computed for theoretically pure uranium.

As a specific example, if the materials of the system under consideration have .0001 part by weight of Co and Ag, the total danger sum in K units for such an analysis would be:

.0001×17+.0001×18=.0035 K unit

This would be a rather unimportant reduction in the reproduction factor K unless the reproduction factor for a given system, without considering any impurities, is very nearly unity. If, on the other hand, the impurities in the uranium in the previous example had been Li, Co, and Rh, the total danger sum would be:

.0310+.0017+.0050=.0377 K unit

This latter reduction in the reproduction factor for a given system would be serious and might well reduce the reproduction factor below unity for certain geometries so as to make it impossible to effect a self-sustaining chain reaction with natural uranium and graphite, but might still be permissible when using enriched uranium in a system having a high K factor.

This strong absorbing action of some elements renders a self-sustaining chain reacting system capable of control. By introducing neutron absorbing elements in the form of rods or sheets into the interior of the system, for instance in the slowing material between the uranium masses, the neutron reproduction ratio of the system can be changed in accordance with the amount of absorbing material exposed to the neutrons in the system. A sufficient mass of the absorbing material can readily be inserted into the system to reduce the reproduction ratio of the system to less than unity and thus stop the reaction. Consequently, it is another object of our invention to provide a means and method of controlling the chain reaction in a self-sustaining system.

When the uranium and the slowing material are of such purity and the uranium is so aggregated that fewer neutrons are parisitically absorbed than are gained by fission, the uranium will support a chain reaction producing an exponential rise in neutron density if the overall size of the system is sufficiently large to overcome the loss of neutrons escaping from the system. Thus the overall size is important.

The size of the system will vary, depending upon the K factor of the system, and upon other things. If the reproduction factor K is greater than unity, the number of neutrons present will increase exponentially and indefinitely, provided the structure is made sufficiently large. If, on the contrary, the structure is small, with a large surface-to-volume ratio, there will be a rate of loss of neutrons from the structure by leakage through the outer surfaces, which may overbalance the rate of neutron production inside the structure so that a chain reaction will not be self-sustaining. For each value of the reproduction factor K greater than unity, there is thus a minimum overall size of a given structure known as the critical size, above which the rate of loss of neutrons by diffusion to the walls of the structure and leakage away from the structure is less than the rate of production of neutrons within the system, thus making the chain reaction self-sustaining. The rate of diffusion of neutrons away from a large structure in which they are being created through the exterior surface thereof may be treated by mathematical analysis when the value of K and certain other constants are known, as the ratio of the exterior surface to the volume becomes less as the structure is enlarged.

In the case of a spherical structure employing uranium bodies imbedded in graphite in the geometries disclosed herein and without an external reflector the following formula gives the critical overall radius (R) in feet:

$$K-1=\frac{C}{R^2}$$

where C is a constant that varies slightly with geometry of the lattice and for normal graphite lattices may have a value close to 7.4.

For a rectangular parallelopiped structure rather than spherical, the critical size can be computed from the formula $$K-1 = C\left(\frac{1}{a^2}+\frac{1}{b^2}+\frac{1}{c^2}\right)$$

where $a$, $b$, and $c$ are the lengths of the side in feet. The critical size for a cylindrical structure is given by the formula, irrespective of the shape of the uranium bodies $$K-1 = C\left(\frac{1}{h^2}+\frac{.59}{R^2}\right)$$

Cylinder height $h$ ft. Radius $R$ ft.

However, when critical size is attained, by definition no rise in neutron density can be expected. It is therefore necessary to increase the size of the structure beyond the critical size but not to the extent that the period for doubling of the neutron density is too short, as will be explained later. A desirable reproduction ratio for an operating structure with all control absorbers removed and at the temperature of operation is about 1.005. The operating size at which any given reproduction ratio can be obtained may be computed from modifications of the above formulae for critical size. For example, for spherical active structures the formula $$K-(\text{reproduction ratio}) = \frac{C}{R^2}$$

may be used to find R when K is known and the reproduction ratio is somewhat over unity. The same formula will, of course, give the reproduction ratio for given structures for which K and R are known.

Critical size may be attained with a somewhat smaller structure by utilizing a neutron reflecting medium surrounding the surface of the active structure. For example, a 2 foot thickness of graphite having low impurity content, completely surrounding a spherical structure is effective in reducing the diameter of the uranium bearing portion by as much as 2 ft., resulting in a considerable saving in uranium or uranium compound.

The neutronic chain reaction referred to can be made self-sustaining in a device known as a neutronic reactor wherein uranium bodies are dispersed in an efficient neutron slowing medium or moderator, when the reactor is made to be just above a critical size where the rate of neutron generation inside the reactor is slightly greater than the rate of neutron loss from the exterior of the reactor. Under these conditions, a self-sustaining nuclear chain reaction can be obtained within the reactor having any neutron density desired, up to infinity. However, to prevent destruction of the reactor, the heat of the reaction must be controlled, and then removed by an amount providing a stable temperature in the reactor at some predetermined and controlled operating level. As the greater the number of fissions, the greater the number of neutrons are present to produce $92^{239}$ converting to $94^{239}$ by successive beta decay, the production of $94^{239}$ is accelerated by operating the reactor at high neutron density levels.

A stable temperature in a neutronic reactor composed entirely of moderator and fissionable material such as, for example, graphite and uranium metal, can only be attained at a relatively low power output as the heat generated can be dissipated only by conduction out of the reactor. Higher power outputs with greater production of $94^{239}$ require additional heat removal.

It is the principal object of our invention to increase the removal of heat from a neutronic reactor during operation in order that the production of $94^{239}$ and/or other products of the neutronic reaction can be accelerated.

It is another object of our invention to conduct a gaseous coolant such as air through a neutronic reactor in such a manner that heat is removed from the reactor without interfering with the operation of the reactor.

As the $94^{239}$ and the various fission products are formed directly in and become a part of the uranium bodies, it is desirable to be able to remove the irradiated uranium bodies from the reactor when a desired concentration of $94^{239}$ is under formation or has been formed therein, in order that chemical separation be most readily accomplished.

It is therefore still another object of our invention to provide a neutronic reactor in which the uranium is readily removed and replaced.

In accordance with the present invention it has been found that heat may be removed from a neutronic reactor most effectively by passing the coolant in contact with or closely adjacent to uranium bodies. Thus it has been ascertained that most of the heat developed in the reactor is developed in the uranium and therefore that to secure effective cooling the coolant should be passed sufficiently close to the uranium to ensure rapid heat removed therefrom.

For the sake of simplicity the invention has been described with particular reference to the use of air as a coolant although it is to be understood that other coolants may be used without departing from the spirit of the invention.

While coolant gas such as air, in many respects is not as efficient a cooling fluid as a liquid, such as water for example, it has many advantages over liquids in that liquids require that piping be inserted in the reactor. These pipes, as well as the liquids that would be circulated through them, absorb neutrons. For example, the pipes and water carried by the pipes in a water cooled reactor absorb sufficient neutrons to increase the overall parasitic neutron absorption by an appreciable amount as will be apparent from the table of danger-coefficients given above.

On the other hand, air requires no pipes and can be circulated through channels cut directly in the solid moderator. Graphite, for example, is porous and when piled in blocks to form the reactor framework contains about 25 percent air. The provision of the air channels, which in effect merely removes some of the moderator, has very little effect on the chain reaction when the proper volume ratio of moderator to uranium is used, and most of the effect of the air channels is to introduce slightly more air in an air cooled neutronic reactor than would be present in an uncooled reactor. Nitrogen does absorb neutrons, but as the air in the channels is only under slight pressure while passing through the reactor, the net effect of the channels and the air is small.

It is, therefore, another object of our invention to provide a means and method for cooling a neutronic reactor with a minimum of interference with the chain reaction.

When air is passed through a neutronic reactor operating at high neutron densities, components of the air itself, such as argon, for example, become radioactive. It is highly desirable, therefore, particularly for the biological safety of operating personnel, that air having any radioactivity associated therewith, be disposed of in a safe manner.

A still further object of our invention is to provide a means and method of safely disposing of air having radioactive components therein.

Broadly stated, our invention includes a neutronic reactor comprising a mass of neutron moderator having uranium containing bodies therein, the moderator being pierced by channels through which air may be circulated to remove the heat of reaction to the extent that a stable temperature can be attained in the device at high neutron densities.

Other objects and advantages of our invention may be more clearly understood by reference to the following description and the attached drawings which illustrate, as an example, one form our invention may take. This example is not to be taken as limiting as other forms within the scope of the appended claims will be readily apparent to those skilled in the art. Requisite information and criteria for operativeness of neutronic reactors are set forth in the copending application of the present inventors filed December 19, 1944, Serial No. 568,904, now Patent No. 2,708,656, dated May 17, 1955.

Referring to the drawings, we have chosen to illustrate our invention by reference to a graphite-uranium reactor, sometimes know as a pile.

Figure 1:
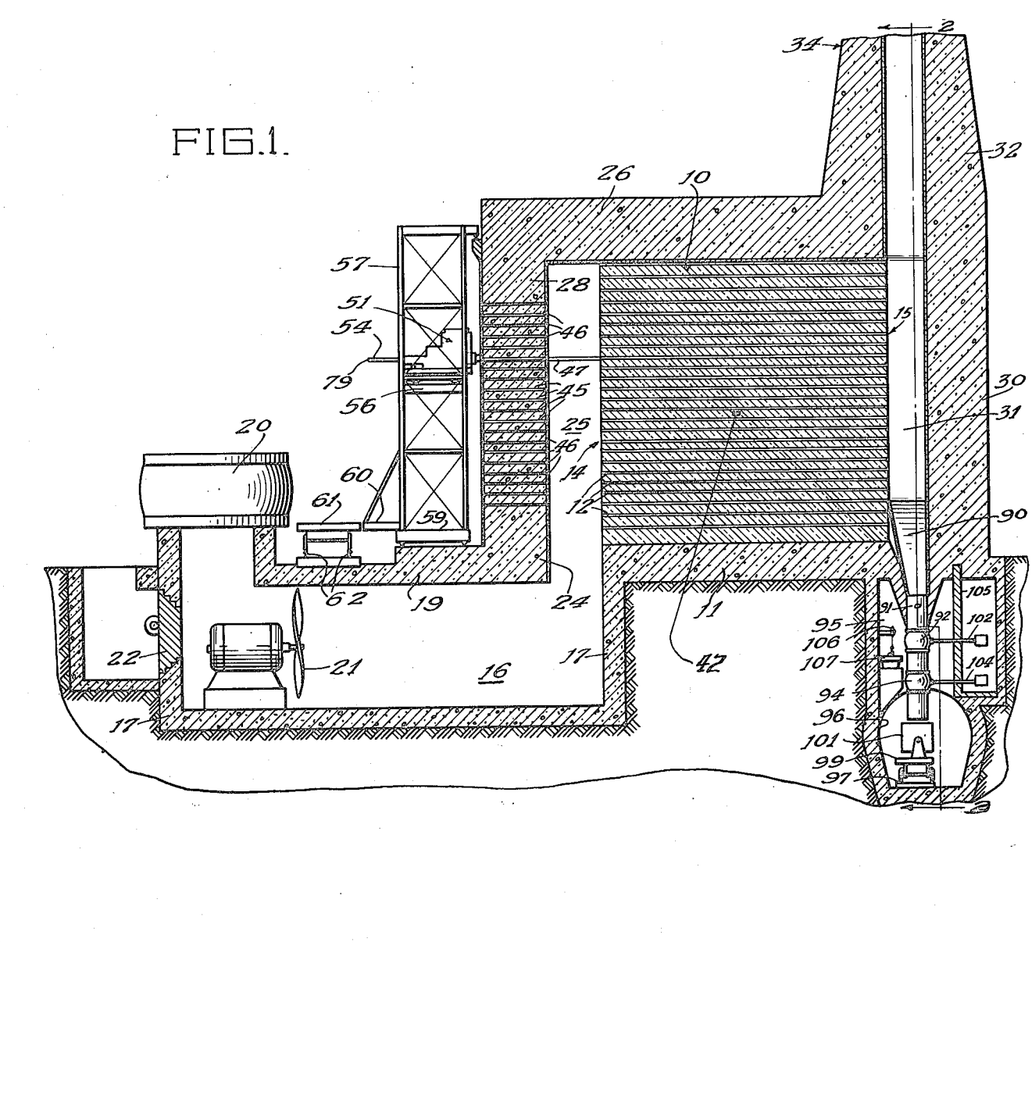
Fig. 1 is a longitudinal view partly in section and partly in elevation of an air cooled neutronic reactor system illustrating our invention.
Figure 2:
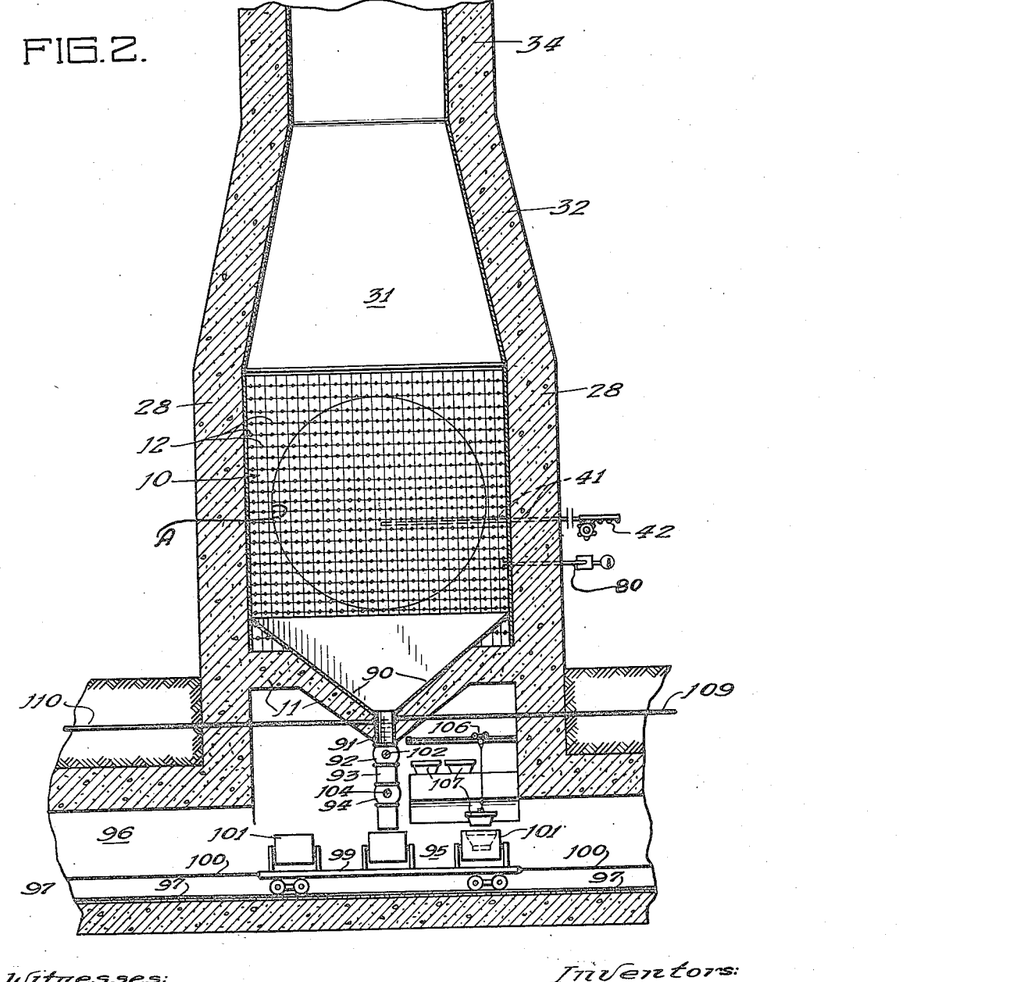
Fig. 2 is a cross sectional view, partly in elevation, taken as indicated by the line 2—2 in Fig. 1.
Figure 3:
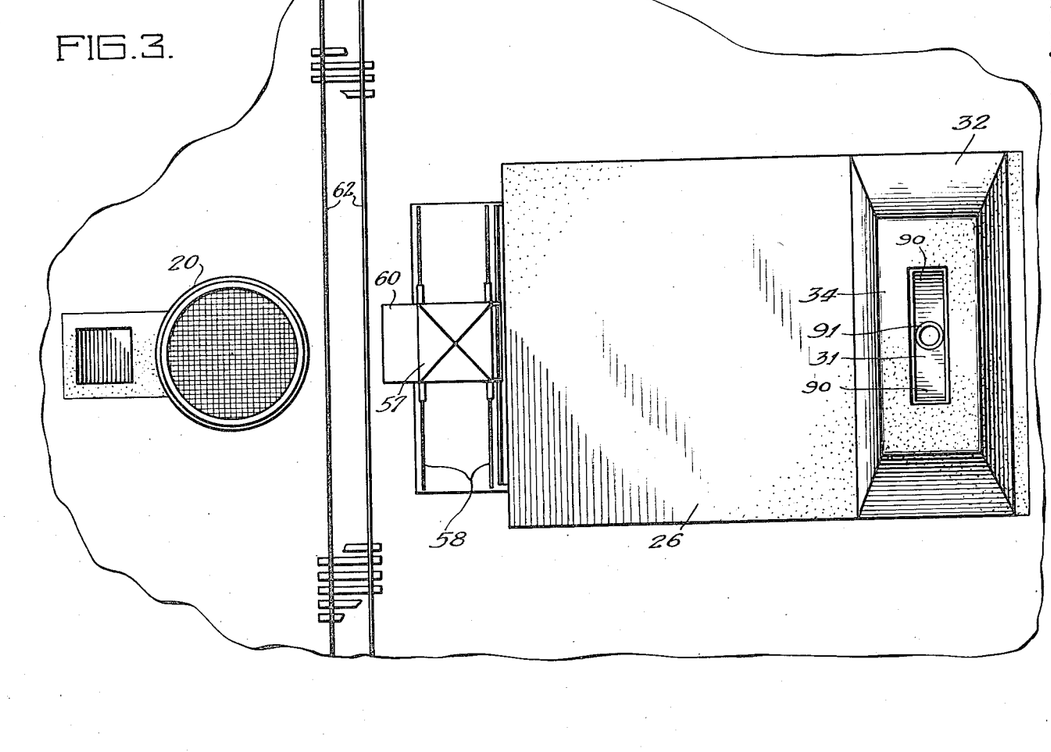
Fig. 3 is a plan view of the system shown in Figs. 1 and 2.

Such a reactor broadly comprises a mass of graphite blocks closely piled or stacked into a cube 10 as shown in Figs. 1 and 2. This graphite cube may be, for example, 24 or 25 feet on a side and rest on a concrete foundation 11. The graphite cube 10 is pierced with horizontal air channels 12, of square cross section, with one of the diagonals vertical. The channels may be readily made by grooving adjacent blocks. The channels are 1.75 inches on a side and extend completely through the reactor, from an inlet face 14 to an outlet face 15. About 1500 channels may be provided, and as will be later brought out, any unused channels can be plugged. Only a few of the channels are shown in the drawings for sake of clarity.

Adjacent the inlet face 14 of the cube, the foundation is continued downwardly to form the floor of an inlet air duct 16 extending outwardly. The inlet air duct 16 is completed by concrete side walls 17 and top 19.

At some distance away from the graphite cube 10 the inlet duct is turned upwardly to terminate in an air filter 20, relatively close to the surface of the ground. A fan or blower 21, here illustrated as electrically driven, is installed on the floor of the inlet duct just below the air filter, access to the fan being conveniently obtained through duct door 22, behind the fan.

The concrete top 19 of the inlet air duct is continued upwardly as an inlet end shield 24, positioned parallel to but spaced away from inlet face 14 of the cube 10 to form an inlet chamber 25 communicating with the air channels 12.

Above the inlet chamber 25 and the cube 10 the concrete is continued horizontally to form a top shield 26, and side shields 28 are built up from the foundation 11 to enclose cube 10. Shields 26 and 28 closely approach the top and side faces of the cube, to minimize air flow around the outside of the cube. A small amount of air circulation, however, may be desirable over the top and side faces to cool these faces.

At the outlet face 15, an outlet end shield 30 of concrete is provided. End shield 30 is parallel to and spaced from the outlet face 15 of the graphite cube to form an outlet chamber 31 communicating above with the base 32 of a stack 34 projecting upwardly and formed as a continuation of the concrete top side and outlet end shields. Thus the cube 10 is completely enclosed by concrete shields or shields of similar inorganic material containing water of crystallization or other neutron absorbing material, with a duct system operating by virtue of pressure provided by fan 21 to conduct air from close to ground level through channels 12 into the stack and then into the atmosphere well above ground level at the top of the stack. The concrete shields may be from five to ten feet thick in accordance with the maximum desired operating power of the reactor and serve as shields to reduce escape of neutrons and gamma radiation.

As a neutronic reaction will take place when uranium bodies are properly spaced in a moderator mass of a certain finite size, the above described device can be made chain reacting by placing uranium bodies in the horizontal channels in such a manner and in such an amount that a neutron reproduction ratio of slightly over unity is obtained, exclusive of all neutron losses within the reactor and from the exterior of the reactor. This reproduction ratio may be defined as the ratio of the number of neutrons gained by fission to the total number of neutrons lost by absorption in the uranium, absorption in the moderator, absorption by impurities in the reactor and by leakage from the reactor for a reactor of finite size.

Using the graphite mass as the moderator to slow fast neutrons to energies where they again are able to create fission in $92^{235}$, the device will have a reproduction ratio of unity when approximately 700 of the channels 11 in the graphite cube are each loaded with 68 aluminum jacketed uranium slugs 35 lying end to end, with a channel spacing of 7 inches measured center to center, and with the loaded channels roughly forming a cylinder as indicated by line A in Fig. 2. Both graphite and uranium should be of highest possible purity.

However, more than a unity reproduction ratio is required, as when the reproduction ratio is exactly unity no rise in neutron density will occur. Under such conditions the device will not develop high neutron densities or power in the form of heat. By loading additional channels, i. e., making the active portion greater than critical size, however, the reproduction ratio within the reactor can be brought above unity in order that a rise in density can occur. Then this excess neutron reproduction can be absorbed by neutron absorbing materials deliberately inserted into the reactor in order to hold the reproduction ratio at an average value of unity after a desired power output has been obtained, as a result of the initial rise in density.

Consequently, in accordance with the amount of excess reproduction ratio desired, about 1000 channels may be loaded with uranium slugs. Most of the channels not loaded with uranium may be closed by inserting plugs, preferably of graphite, in such channels in order to conserve air. Some of the channels, however, in the peripheral portions of the cube may be left open for cooling of the graphite in those portions.

Figure 4:
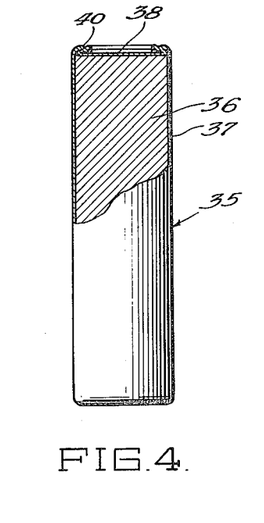
Fig. 4 is a longitudinal sectional view partly in elevation of a jacketed slug.

One preferred form of slug construction is shown in Fig. 4. Each uranium metal slug is 1.1 inches in diameter and 4 inches long covered with an aluminum jacket approximately 20 mils thick in good heat conductive relation to the uranium. The slugs weigh about 2½ pounds each.

In forming the slugs 35, the uranium portion 36 is machined to size, cleaned in trisodium phosphate and then washed in water. Aluminum zinc or other non-fissionable metal of low neutron absorption jacket cans 37 are provided having an inside diameter somewhat larger than the uranium portion. This can 37, open at one end only, is slipped over the uranium after being cleaned in benzine and hot water. The can 37 with the uranium inside is then passed through a sizing die of 1.134 inches diameter. This die, being of smaller diameter than the 1.1 inch uranium portion plus the two 20 millimeter walls, draws the can in tight thermal contact with the uranium.

A cup-shaped cap 38 is then placed base down inside the projecting portion of the can 37 and is seam welded to the can. The projecting portion is then cut off above the seam weld 40 and the remaining projecting portion including the weld, spun over the adjacent end of the slug. Thus each jacket completely encloses and seals the uranium, preventing air from corroding the uranium and, as will be pointed out later, also preventing or restraining fission fragments created by nuclear fission at the surface of the uranium from entering the air stream.

The channels are loaded with uranium until the reproduction ratio, with neutron absorbers removed and the coolant flowing through the reactor, is about 1.005 to 1.006. This means that for every two hundred neutrons starting in each neutron generation about two hundred and one neutrons are produced in the reactor over and above all losses. Under these conditions and taking into account the fact that about one percent of the neutrons of fission are delayed in their emission for a mean time of about 5 seconds, the neutron density of the reactor will double every 8 to 15 seconds. With some part of the neutron absorbers inserted but with the insertion of less than the amount of neutron absorbers required to make the reproduction ratio unity, the rise is slower. When the neutron absorbers are almost but not entirely inserted the doubling of the neutron density may take several hours. Then when a desired density has been reached, the reproduction ratio can be reduced to unity so that the desired density is continuously maintained by the introduction of neutron absorbing material into the reactor.

The neutron absorbing material is introduced into the reactor by means of a control rod 41 as shown in Fig. 2. This control rod extends into the graphite cube, sliding in a channel therein and is operated from outside of side shield 28 as by rack and pinion 42. The rod is made from, or incorporates therein, an efficient neutron absorber, such as for example, cadmium or boron. A sheet of cadmium riveted to a steel strip forms a satisfactory control rod. As the depth of insertion of the rod determines the amount of neutron absorbing material inside the reactor, the critical position of the rod is where the rate of neutron absorption by the rod balances the reproduction ratio at unity. Thus, by moving the rod outwardly from the critical position the neutron density in the reactor will rise. Moving the rod inwardly from the critical position causes the reproduction ratio to fall below unity, and the reaction stops. Thus the reaction is always under control, and as the rise in neutron density is exceptionally slow as the rod approaches the critical position, manual control is possible. Other and similar rods (not shown) may be provided, if desired, for rapid progression into the reactor to stop the reaction in case of failure of the control rod to stop the rise in neutron density for any reason. Such rods are termed safety rods.

During operation heat is released in the reactor in accordance with the neutron density therein. Most of the heat arises from the kinetic energy of the fission fragments and about 92 percent of the energy is released in the uranium. About 6 percent is released in the graphite due to neutron absorption therein and about 2 percent escapes from the reactor in the form of neutrons and gamma radiation. Consequently, the reactor can only be operated at a power dependent upon heat removal to the point where a stable temperature obtains. Otherwise, the reactor will accumulate heat to the point that the device may be damaged. Since aluminum melts at 658° C. stable temperatures below this value should be used although with jackets of other non-fissionable metals, such a beryllium, the stable temperature may be increased, although if the temperature should rise too high the uranium bodies might be damaged even when using beryllium jackets as uranium of the type used in neutronic reactors melts at about 1100° C.

A stable temperature is obtained in the device of the present invention by passing atmospheric air through the reactor, and in the specific example shown and described, the air is passed through the graphite channels and directly in contact with the aluminum jackets of the slugs. Under these circumstances the reactor can be operated continuously at 250 kilowatts electrical equivalent of heat by passing 32,000 cubic feet per minute through the reactor with a maximum temperature rise of the slugs to about 100° C., and at 500 kilowatts continuously with about 50,000 cubic feet per minute of air with a maximum metal temperature of 200° C. The output of the reactor can be stabilized at still higher powers by passage of a greater volume of air therethrough if desired.

Having discussed generally the operation of the reactor, and the temperature stabilization thereof by air cooling at elevated powers and neutron densities, we will now describe one means and method by which the reactor can be loaded and unloaded, in order that the neutron irradiated uranium can be removed for further processing such as the recovery of $94^{239}$ formed in the uranium, and fresh uranium inserted for subsequent operation of the reactor.

Figure 5:
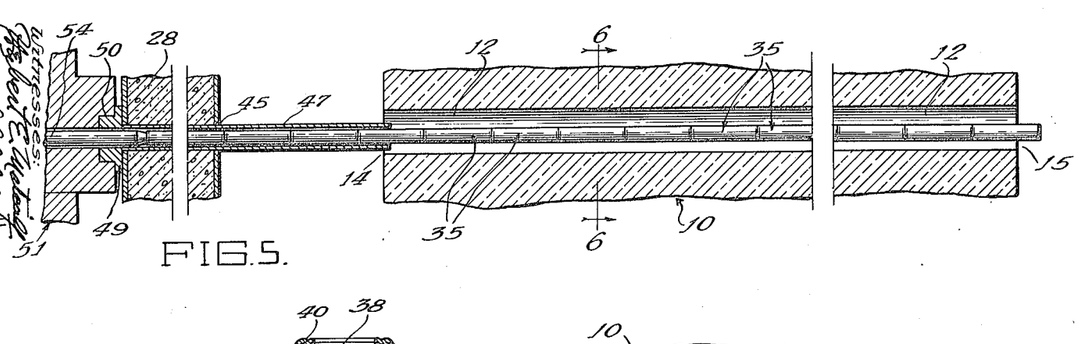
Fig. 5 is a longitudinal sectional view, partly in elevation, of a horizontal channel during a loading and unloading operation.
Figure 6:
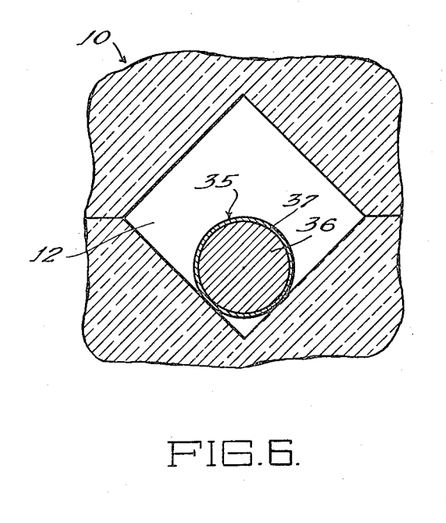
Fig. 6 is a cross sectional view taken as indicated by the line 6—6 in Fig. 5.

To accomplish loading of the slugs 35 into the various air channels 12, the concrete of the inlet end shield 24 is pierced with a plurality of loading apertures 45, as shown in Figs. 1 and 5, each aperture being aligned with the axis of slug positions in the air channels 12. Normally, during operation of the reactor, each aperture 45 is closed by a removable lead plug 46 extending through the shield 28 only.

When it is desired to load a channel with new slugs, the lead plug 46 for that channel alone is removed, and a charging tube 47 inserted, extending through the inlet end shield 24, across the inlet chamber 25 and entering the corresponding air channel 12 as shown in Fig. 5. The outer end of charging tube 47 is provided with a flanged nipple 49 shaped to engage a nipple recess 50 of a loading mechanism indicated generally by numeral 51. It will be noted that the charging tube is smaller than the air channel 12 and that air can pass through the channel being unloaded. The air should circulate during unloading, although it may be at reduced velocity.

Loading mechanism 51 comprises a loading magazine 52, a loading plunger 54, and a plunger drive 55, as shown in Figs. 7 to 10 inclusive.

The loading mechanism 51 is mounted on an elevator platform 56 mounted to be raised and lowered in an elevator frame 57 capable of moving along the outside of inlet end shield 24 on elevator tracks 58. Base 59 of the elevator frame is provided with a platform 60 projecting outwardly on the same level as the top of a supply car 61 travelling on supply car tracks 62. Supply car 61 is used to bring a supply of slugs to the elevator for use in the loading mechanism 51.

The slugs 35 when received at the elevator, are loaded into an inclined loading channel 64 in the loading magazine, in side by side relationship and feed by gravity to the bottom the roof. The bottom of loading channel 64 is a part of plunger bore 65 extending through the loading magazine ending in the nipple recess 50 cooperating with flanged nipple 49 on charging tube 47 so that the plunger bore 65 and the loading bore in guide tube 47 are in concentric alignment. To provide engagement and disengagement of nipple recess 50 and nipple 49, the entire loading mechanism is movable with respect to elevator platform 56 on wheels 67 running in guides 69 on the elevator platform.

Figure 7:
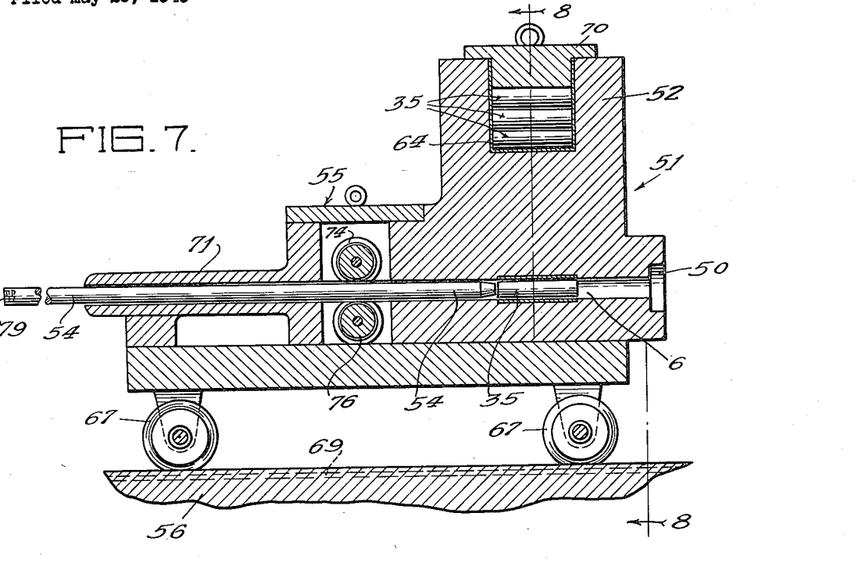
Fig. 7 is a longitudinal sectional view, partly in elevation, of one form of loading device.
Figure 8:
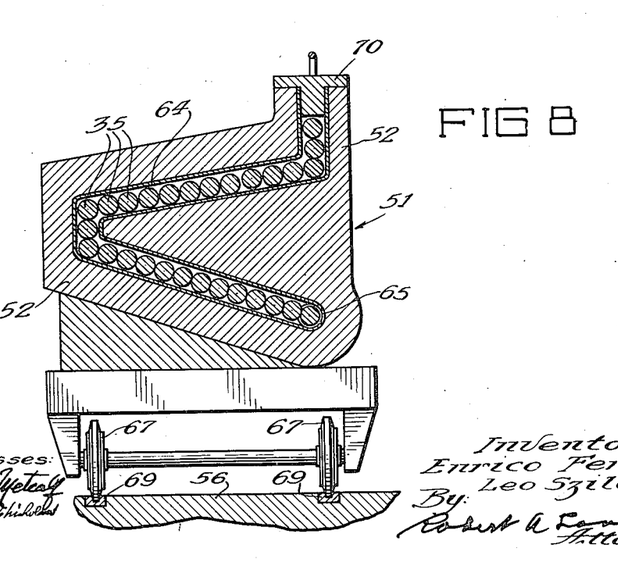
Fig. 8 is a view partly in section and partly in elevation taken as indicated by the line 8—8 in Fig. 7.

It will be noted that loading magazine 52 is massive. In some instances it may be desirable to load slugs already partially irradiated and in consequence radioactive. The thick walls of the magazine then act as a shield for the radioactive slugs, and in this case a heavy cap 70 may close the upper opening of the loading channel 64. Iron or lead may be used for the body of the magazine. In addition, the use of the thick metal in the magazine, particularly around the plunger bore 65, reduces radiation that might pass through the interconnected loading aperture 45 and guide tube 47 either from radioactive slugs therein or from the irradiated slugs in the reactor when charging tube 47 is empty.

The slugs are fed from magazine 52 by a reciprocating motion of plunger 54 operating in plunger bore 65. Plunger 54 may be of iron to act as a shield when inserted into charging tube 47 and is supported outwardly by plunger bearing 71 on the opposite side of a plunger drive 55.

Figures 9, 10, 11:
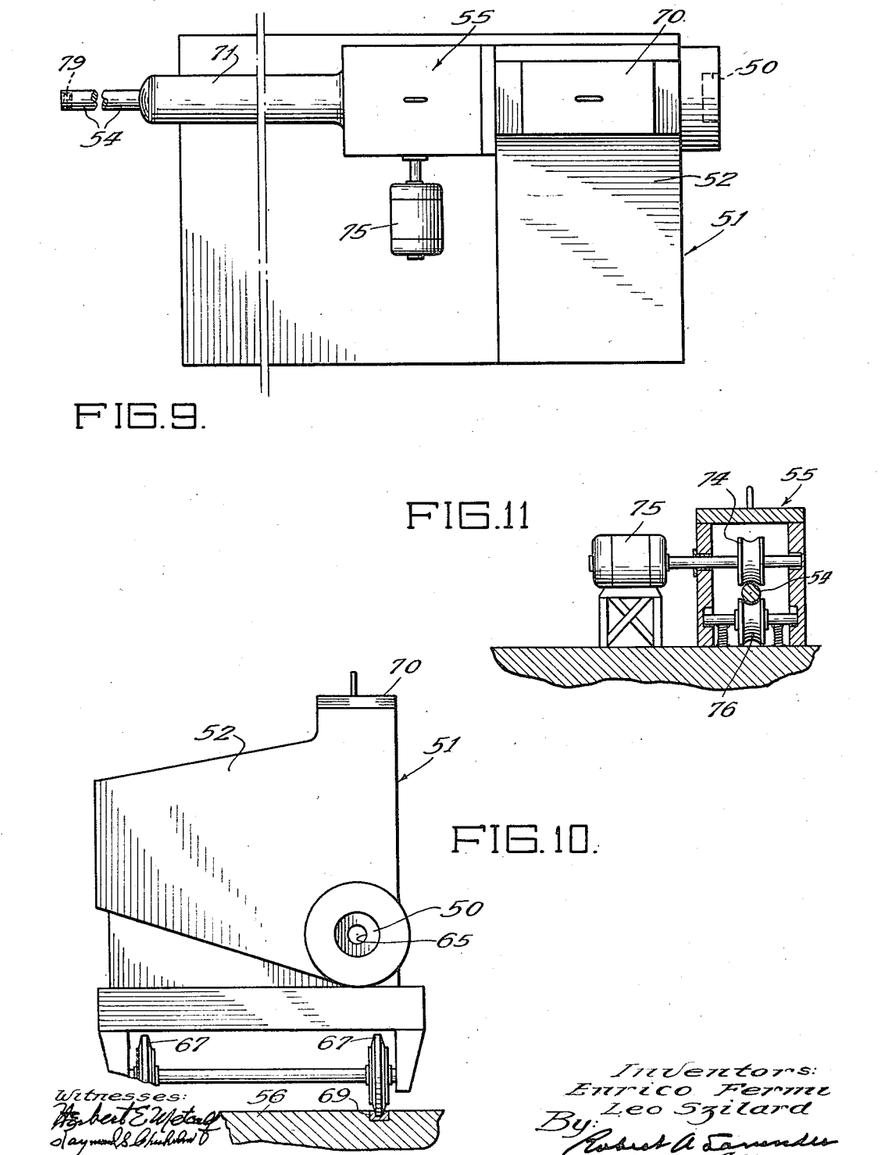
Fig. 9 is a top plan view of the loading device shown in Figs. 7 and 8.
Fig. 10 is a side view of the loading device shown in Figs. 7, 8 and 9.
Fig. 11 is a view partly in section and partly in elevation of a friction drive used in the loading device.

Plunger drive 55 in simplified form may be a friction wheel 74 driven by motor 75 as shown in Figs. 7, 9 and 11 opposed by an idler wheel 76 pressed against plunger 55 by spring 77. Motor 75 is reversible and under control of the loading operator. Plunger 54 is sectional, having a threaded end 79 capable of making connection with additional plunger sections. Sufficient sections are provided to insert the plunger entirely through an air channel 12 when required.

In the initial loading of the graphite cube 10, loading is started with the more central air channels until 68 slugs have been placed in the guide tube 47 and connected channel. Plunger 54 is then operated to push the slugs into the channel until the outer end of the first slug is at the outlet face 15. The plunger is then withdrawn, leaving the outer end of the last slug about 16 inches from the inlet face 14, for purposes explained later.

Proceeding outwardly and preferably concentrically, additional channels are loaded, meanwhile checking the neutronic activity of the reactor. As the activity increases as the loading approaches a critical size, that is, the size where the reproduction ratio will be exactly unity, the approach to critical size can be predicted by extrapolation of observed neutron density values with respect to the volume of the cube loaded with uranium. The neutron density values can be obtained from an ionization chamber 80 (Fig. 2), for example, using any well-known indicating circuit, or by measuring the radioactivity of indium foils, for example, induced by neutron irradiation when inserted into the reactor.

As the critical size is approached, the control rod 41 is inserted deeply into the reactor to prevent a self-sustaining chain reaction; and loading is continued until the desired maximum reproduction ratio of, for example, from 1.005 to 1.006 is attained. This ratio can be checked by removal of the control rod and measuring the time taken by the reactor to double its neutron density. From this period, the reproduction ratio can be mathematically computed.

When the desired number of channels are loaded the active core of the reactor may contain from 34 to 50 tons of uranium, and will be ready for operation. Graphite plugs for the unused channels may be loaded in a manner similar to that described for the uranium slugs.

It will be noted that on 4 sides of the graphite cube excess graphite will be present. One the fifth side, i. e., at the inlet face, graphite will also extend 16 inches beyond the uranium. On the remaining side, i. e., the outlet face, no graphite extends beyond the uranium. Thus, 5 sides of the active portion (the uranium bearing portion) are surrounded by graphite. This graphite constitutes a reflector and reduces the amount of uranium required to reach critical size.

As stated above, graphite and other neutron moderators can be used around the active portions of a neutronic reactor, as such materials scatter neutrons passing through them and thereby change the direction of the neutrons. Statistically, due to the scattering action, a large part of the neutrons that otherwise would be lost to the active portion are returned to it, thus reducing exterior loss and thereby reducing critical size. In the present instance the reduction in size is slightly less than the optimum, as only 5 sides of the active portion are surrounded with the reflecting layer.

It will be noted that more air channels are originally provided in the graphite cube than are required for the disposition of the uranium containing slugs. The manner in which the uranium is disposed in the graphite is known as the geometry of the system, and this geometry may be varied to suit conditions, for example, the system as described may be said to have rod geometry with cylindrical loading, as the end to end relationship of the slugs forms, in effect, a long rod of uranium. Further, the use of full length rods in all channels concentrically arranged around the center of the active portion, gives that portion a generally cylindrical shape.

Figure 12:
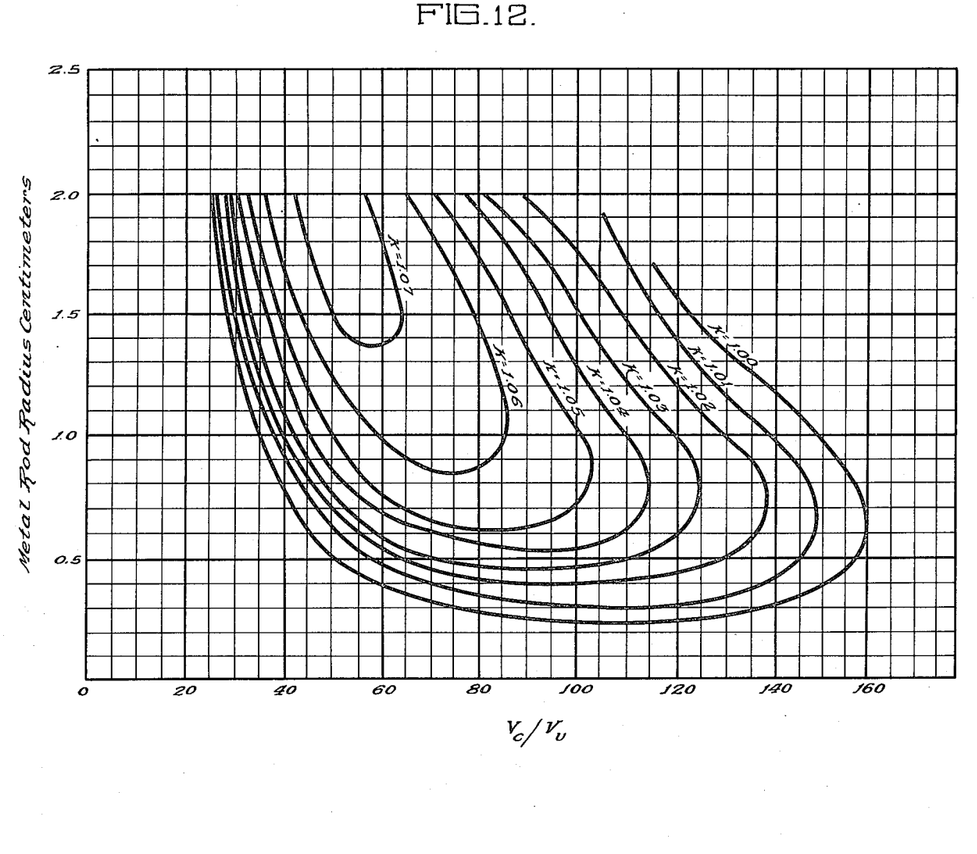
Fig. 12 is a diagram or chart showing K factors for various radii of uranium metal rods.

In Fig. 12, contour lines have been plotted for lattices of theoretically pure uranium metal rods of a density of approximately 18 gms. per cc. embedded in theoretically pure graphite.

Along the ordinates of the graph are plotted the radii of the rods. Along the abscissae are plotted volume ratios of graphite to uranium. These values give the volume ratio of carbon to uranium for the unit cell that is repeated to form the lattice and for the structure, as any particular lattice geometry is a mere repetition of like cells.

The curves of Fig. 12 have been drawn from a number of observed values of K, and, in addition, from many computed values. The computed values are based on the fact that K is proportional to the product of three factors: $p \times f \times \epsilon$, where $p$ is the probability of a fast fission neutron escaping resonance capture and becoming a thermal neutron; $f$ is the fraction of the thermal neutrons absorbed by uranium (both by simple capture and to produce fission) rather than by the graphite; and $\epsilon$ is a small factor by which the number of neutrons is increased because of additional neutrons due to fission produced by the fast fission neutrons before leaving the lump of uranium. Each of these factors may be computed separately by methods known to physicists, using experimentally determined constants appropriate to these phenomena. The proportionality factor required to obtain K from the product of these three factors has been determined from the measured values of K in certain special cases and also checked by independent experiments. The K contour lines for natural uranium metal rods or cylinders are presented in Fig. 12. The values set forth on the graphs are only accurate within a reasonable margin of error due to the necessity of extrapolation and interpolation of the results obtained by more accurate and actual measurements of lattice arrangements, such as, for example, the results obtained by the measurement of lattice structures too small to support a self-sustaining chain reaction, as set forth in Enrico Fermi's application, Serial No. 534,129, filed May 4, 1944, now Patent No. 2,780,595, dated February 5, 1957. However, if structures are built well within the limits of the curves shown, using materials of a purity presently obtainable, and to the proper critical sizes, a self-sustaining chain reacting system will result.

The highest values for the reproduction factor K are obtained where both the neutron resonance absorption in the uranium and the neutron absorption in the graphite have minimum values. As the uranium bodies are enlarged, for any given volume ratio, surface resonance absorption will decrease but carbon absorption will increase. The increase in carbon absorption in this case is due to the fact that the larger the uranium bodies are, for any given volume ratio, the greater will be the distance between the bodies. The neutrons reduced to thermal energies will then have to diffuse in the carbon over a longer path, thus increasing the probability of capture by carbon, before entering uranium. Likewise, as the size of the uranium bodies is decreased, uranium resonance absorption increases, and in fact, increases faster than the decrease of carbon absorption. Consequently, with all other factors remaining constant, as the size of the uranium bodies and the ratio of the volume of graphite to uranium departs from the optimum, the reproduction factor will decrease in value, as shown in Fig. 12.

It can be seen from the curves in Fig. 12 that if the radii of the uranium rods are less than .25 cm. the value of the reproduction factor K is less than unity for all volume ratios of graphite to uranium, so that for rod sizes of natural uranium metal less than this value, it would be impossible to build a self-sustaining chain reacting system irrespective of the overall size of the structure. For rods of greater radius than .25 cm., it is possible to obtain values for the reproduction factor K greater than unity, providing the ratio between graphite volume and the volume of the uranium is within certain limits shown on the graph. The innermost contour shown in Fig. 12 represents a value for the reproduction factor K of 1.07. At approximately the center of this contour a higher reproduction factor K, for example, about 1.08 would be found. This highest value is for optimum conditions with theoretically pure uranium rods of about 1.7 cm. in radius, and a volume ratio of about 52 carbon to 1 uranium.

Lump geometry may also be used in the reactor, and is accomplished by separating the individual slugs by graphite rods, for example 4 inches long and of about the same diameter. In this case additional channels will be loaded to bring the amount of uranium almost to the same value as that used in the rod geometry, although the lump geometry is slightly more efficient than rod geometry.

Furthermore, a spherical shape is somewhat more efficient for the active portion than a cylindrical shape, and can be approached with either rod or lump geometry by shortening the extent of uranium loading in the channels as the peripheral concentric layers are added, until an approximate sphere is formed. A suitable compromise is the use of one or more concentric rings of outer channels around a cylindrically loaded central portion, with only half the number of slugs in the outer channels and disposed with the ends of the slug row equally distant from the ends of the fully loaded rows. Other arrangements will be apparent to those skilled in the art.

In the presently described device using 1.1 inch diameter slugs inserted in end-to-end relation to form 22 foot rods spaced 7 inches center to center, the curves indicate a K factor of about 1.06, and a volume ratio of about 47 carbon to 1 uranium. The active portion is 22 feet long and about 21 feet in diameter (circular cross section) for operating conditions, i. e., it is above critical size.

It will be noted that the formulae for critical size and operating size are given herein for reactors with no reflector. It will be further noted that the curves in Fig. 12 are given for theoretically pure graphite and uranium.

As pointed out previously the presence of impurities or other neutron absorbers in the reactor may reduce the K factor of the reactor substantially. However, use of a reflector substantially reduces loss of neutrons due to leakage and consequently such reduction permits use of uranium of lower purity.

After the reactor is loaded the fan is started and the control rod is withdrawn until a rise in neutron density to a desired power output where a stable temperature in the reactor is attained. The control rod is then progressed into the reactor until a neutron balance is obtained with the reproduction ratio at unity, thus maintaining the chain reaction at the desired operating power. Small variations from the unity reproduction ratio will occur during operation, due to temperature variations of the cooling air, and to change in barometric pressure and to minor variations in air pressure delivered by the fan. However, such variations are compensated by slight inward or outward corrective movements of the control rod, either by hand in response to indicated variations in neutron density, or automatically by direct linkage of the control rod to the output of the ionization chamber 80. However, such automatic control is no part of the present invention.

During operation of the reactor, the air passing through the reactor becomes radioactive due to the fact that it is subjected to intense neutron irradiation. Investigation has proved that the only significant radioactivity present in the air after having passed through the operating reactor is that of Argon$^{41}$, having a 110 minute half-life. At 500 kilowatt power, however, this activity is present in the exhaust air to the point that it would be biologically dangerous to operating personnel unless highly diluted during its radioactive decay. For that reason the air passing through the operating reactor is not delivered to the amtosphere at ground level but is exhausted at a substantial distance above ground, such as for example from the top of a 200 foot stack, with the result that when and if any of the radioactive Argon$^{41}$ reaches ground level it is so dispersed in and diluted by fresh atmospheric air that less than .1 Roentgen per day will be received by any persons on the ground, either close to or away from the stack. Thus, the air is only passed once through the reactor and does not acquire excessive radioactivity.

The sole presence of the above noted type of radioactivity, however, is predicated on the use of the jackets capable of restraining escape of fission products sealed around the uranium bodies. Aluminum is preferred for the jackets, as aluminum has a relatively low neutron capture capability and, consequently, can be used in substantial amounts in the reactor without absorbing or capturing sufficient neutrons to prevent a self-sustaining chain reaction from occurring. Aluminum also corrodes very slowly in hot air. Other metals such as zinc, stainless steel or lead may be used.

The jackets have two functions, both of which reduce radioactivity of the cooling air. The first is to prevent oxidation of the uranium. While considerable oxide could be tolerated in the reactor itself if the uranium were to be used in unprotected condition, some of the oxide particles would be picked up by and exhausted in the cooling air. As these particles would be highly radioactive and relatively heavy, the proper dispersal thereof would be a difficult problem.

In addition, if operation should be accomplished in the reactor with bare uranium, fission fragments from nuclear fissions occurring on the surface of the uranium would also be projected into the air stream and would be carried out by the air stream. These fragments are exceptionally radioactive and could not safely be dispersed into the atmosphere. When jackets are used, these fragments are, however, stopped by the jackets and cannot enter the air stream.

Thus, the jackets prevent corrosion of the uranium and prevent fission fragments and corrosion products of uranium from entering the air stream. As fission fragments will pass through an extremely small hole, one method of monitoring the reactor for jacket failure, such as for example a weld crack, is to monitor the radioactivity of the stack gas. If the stack gas shows any substantially radioactivity other than that of Argon$^{41}$ then it is clear that a jacket failure has occurred. Such monitoring of the stack gas is normally a routine procedure of an operating air cooled reactor, but forms no part of the present invention.

After operation of the reactor for a sufficient length of time for an amount of 94$^{239}$ to be created sufficient for chemical separation, such as for example 100 days at 500 kilowatts, the reactor is shut down by inserting the control rod fully into the reactor. After about one-half hour's wait, during which all delayed neutron emission will have ceased and the more violent radioactivity subsided, the reactor may be unloaded.

The unloading may be accomplished in two ways, either by using the plunger to push the slugs out of the channels so that they fall by gravity out of the outlet face 15, or by using the plunger to insert new slugs in the channels, each slug so inserted pushing an irradiated slug out of the outlet face 15. In the first instance the graphite cube will be left empty after unloading. In the second instance the insertion of new slugs is continued until all or a predetermined part of the irradiated slugs are out of the reactor, having been replaced by fresh material. Thus, the reactor is left ready for the next run. Under ordinary circumstances the latter manner of unloading is preferred.

In either case the slugs drop by gravity from the outlet face into outlet chamber 31, falling on to two angularly disposed pad plates 90 positioned to intercept the falling slugs, in the bottom half of outlet chamber 31 as shown in Figs. 1 and 2. The two plates slant to a centrally disposed outlet pipe 91 extending downwardly through foundation 11 and provided with spaced valves 92 and 94. The slugs fall by gravity into pipe 91 above valve 92.

Outlet pipe 91 opens into a lower coffin chamber 95 that in turn connects with a tunnel 96 carrying car tracks 97 on which a coffin car 99 may be moved by means of cable 100. Coffin car 99 supports a plurality of slug coffins 101 in position to be successively positioned beneath the lower opening of pipe 91.

Valves 92 and 94 are operated by means of rods 102 and 104, respectively, from behind a heavy lead shield 105, as shown in Fig. 1. A crane 106 is used for placing coffin caps 107 on each coffin after it has been filled with irradiated slugs.

Before unloading is started, both valves 92 and 94 are closed, and the upper portion of pipe 91 is filled with water from water inlet pipe 109. A proper water level is maintained above valve 92 by water outlet pipe 110. The air circulation is maintained, although it may be reduced to about 25 percent of the operating value. Slugs are then pushed out of the reactor to fall on to pad plates 90 and then roll by gravity into the water in the upper part of outlet pipe 91.

In order that there be no material damage to the jacketing of the slugs, plates 90 are preferably padded with a soft material that does not deteriorate under neutron irradiation, and that will be able to withstand the slug impacts. A satisfactory pad has been found to be ¼ inch cotton duck on felt laid on wood backed by steel. Combinations of various synthetic elastic materials have also been found satisfactory.

After a number of slugs have been collected above valve 92 sufficient to fill a coffin 101, unloading is stopped and valve 92 is opened, permitting the slugs and the water to drop through the valve and remain in the space between valves 92 and 94. Valve 92 is then closed, the water level re-established and unloading continued. In the meantime, valve 94 is opened permitting the slugs and water to fall into one of the coffins 101. The car is then moved to register the opening of the next coffin with the end of the outlet pipe and the first coffin is capped. The procedure is continued until all of the irradiated slugs are in coffins. These coffins may then be taken to a soaking pit (not shown) to remain until the radioactivity has decayed to a point where the slugs can be submitted to chemical removal of the products formed therein by irradiation. After 100 days' operation the aging period may be about 30 days.

Removal of the irradiated slugs under the conditions specified is performed for two reasons. Firstly, the slugs are so highly radioactive that they cannot be safely approached by personnel without adequate shielding being interposed, and, secondly, for some time after removal from the reactor this radioactivity is so intense that self absorption of the emitted radiations causes self heating of the slugs sufficient to melt the slugs if not cooled in some manner. By unloading during maintenance of the air stream, by dropping the slugs at once into water, and by keeping the slugs in water until the more violet radioactivity has subsided, melting is prevented, as the slugs are cooled as they boil the water in which they are immersed. The slugs are then stored or aged under water until ready for chemical treatment, as for example, for thirty days.

It will thus be seen that we have provided a means and method of removing the heat of reaction from a neutronic reactor to the extent that the reactor may be continuously operated at neutron densities well above those safely obtainable in an uncooled reactor. The increased neutron densities lead to more rapid production of $94^{239}$ and other products of neutron irradiation, and by means of our invention, the irradiated uranium containing these products can readily be removed from the reactor and fresh uranium inserted. In addition, the radioactive gases in the cooling air are safely disposed of.

It is also to be noted that reactor operation at 250 to 500 kilowatts heat equivalent has been mentioned. These powers, however, are in no way maxima as the operating powers are dependent solely on the air supply available and the permissible maximum slug temperatures. Ordinarily slug temperatures of from 100° C. to slightly over 400° C. are permissible without special treatment of the uranium bodies before jacketing. In case, however, it is desired to operate the reactor with a maximum slug temperature above about 430° C., then precautions should be taken to remove occluded hydrogen from the uranium to less than .0002 percent in order to prevent swelling of the packets by release of this hydrogen. At temperatures below 430° C. no swelling occurs from the release of occluded hydrogen, as uranium hydride is formed, preventing rise of internal pressure. Above 430° C., however, internal pressure from released hydrogen may, with unprocessed uranium, swell the jackets. The occluded hydrogen, however, is easily removed from the uranium bodies by heating them to a temperature of from 580° C. to 600° C. under continuous evacuation by a vacuum pump until equilibrium is reached. The uranium bodies are then cooled 10 to 20 hours, preferably in an argon atmosphere, and then jacketed. When processed in this manner no swelling will occur at any temperature. Thus, if desired, the reactor can be operated at powers of from 1000 kilowatts to 5000 kilowatts, when the proper amount of air is supplied, and the hottest slugs permitted to rise in temperature to from 400° C. to 500° C.

While the invention has been described with particular reference to a graphite type of moderator, it is to be understood that it is not limited to this moderator and that other neutron slowing materials which do not have an excessive neutron absorbing property may be utilized. For example, heavy water ($D_2O$) may be used very effectively for this purpose and in such a case suitable channels may be provided in the liquid $D_2O$ for passage of the coolant therethrough. Moreover, beryllium is also found suitable.

In accordance with a further modification coolants other than air may be suitable, for example, helium or oxygen or fluorine are suitable for this purpose. In addition other coolants such as water, deuterium oxide, etc. may be used in liquid or vapor state. The problem in selecting a proper coolant is dependent upon the tendency of the coolant to absorb neutrons. Thus if an excessive quantity of neutrons are absorbed by the coolant, the number of neutrons remaining for absorption by uranium and fission of $U^{235}$ will be insufficient to permit establishment and maintenance of a self-sustaining chain reaction. Consequently it is desirable to utilize a cooling agent which has but a slight tendency to absorb neutrons and in any event it is desirable to avoid establishment of a quantity of cooling agents in the reactor of such magnitude that the amount of neutrons absorbed will prevent maintenance of the chain reaction. Where gaseous coolants are used it is preferred to use those having a danger coefficient below about 15 preferably below 2.5.

Where a coolant gas is expensive as is the case with helium suitable means, not shown, may be provided for collecting and recirculating the cooling gases and the entire reactor assemblage may be enclosed in a gas tight shell to minimize or prevent substantial loss of the coolant gas.

Within limits the approximate effect of any quantity of coolant may be computed by computing the total quantity of coolant in the reactor at any given time. Where piping or conduit is used in the channels or other portion of the reactor as is the case when a liquid coolant is used or where a liquid moderator is used, the danger sum of the piping also must be considered. The danger sum of the circulating system including coolant and piping if used may be computed in the manner previously described for computing the danger sum of impurities or neutron absorbers in the reactor simply by determining the weight of coolant and piping in the reactor per unit weight of uranium and the danger coefficient for each impurity or absorber. In no case should the danger sum of the coolant and piping in the reactor be so great as to reduce the reproduction factor K below unity. The permissible danger sum will be determined therefore by the magnitude of K of the reactor without the coolant and piping.

For example, with natural uranium and a carbon moderator maximum K obtainable is about 1.1 and in no case can the danger sum of the coolant and conduit therefore exceed 0.1. Preferably in such case the danger sum of the coolant and conduit should be maintained below about .05. On the other hand, with a moderator which has less tendency to absorb neutrons, such as $D_2O$, the maximum K obtainable is approximately 1.3 and in such a case, the danger sum of the coolant and piping or conduit should certainly be less than 0.3, likewise the danger sum when natural uranium is used in a beryllium moderator, the danger sum should be less than 0.18. Where other neutron absorbers such as impurities, controls, etc. are present, the permissible quantity of coolant is decreased by the danger sum of such absorbers. Moreover most reactors have a substantial leakage factor usually not less than 0.01 K units and thus permissible coolant must be diminished by the factor. The maximum permissible danger sum may be increased where enriched materials containing concentrations of $U^{235}$ or $94^{239}$ greater than the concentration of $U^{235}$ in natural uranium but in all events the volume of coolant in the reactor should be correlated in accordance with the reproduction factor and/or reproduction ratio to prevent these ratios from decreasing below unity or at least to secure and average reproduction ratio of unity.

In general it is found to be hazardous to permit the reproduction ratio from becoming excessively high since in such a case the rate of increase of neutron reproduction is so rapid that control of the reaction may be impossible. It has been found that while most of the neutrons are released almost instantly upon fission a small portion thereof are delayed and are released from one-half to 60 seconds or more after neutron bombardment. In the case of $U^{235}$ approximately one percent of the neutrons evolved are delayed neutrons. Control of a reactor may be effected without difficulty by maintaining the reproduction ratio at a value of at least about one but not over one by more than a fraction equal to the fraction of neutrons evolved which are delayed neutrons. Thus in the case of $U^{235}$ and similar products the reproduction ratio should not exceed 1.01 and the amount of coolant introduced should be such as to maintain an average reproduction ratio of about one and in any case at least about one and no more than about 1.01. For ease of control it is preferred that this ratio should not exceed 1.005.

While the invention is particularly concerned with reactors in which natural uranium is used as the source of fissionable isotope, other compositions consisting of or containing fissionable isotopes which upon fission yield neutrons may be utilized. For example, enriched compositions containing $U^{235}$, $U^{233}$, or $94^{239}$ dispersed in $U^{238}$ or $Th^{232}$ may be used for this purpose. Compositions containing 5, 10 percent or even more of the fissionable isotope in such cases may be used and under such conditions a greater latitude in the amount of coolant which may be permitted in the reactor is possible.

Where compositions comprising abnormal amounts of $U^{235}$ therein or containing $U^{233}$ or $94^{239}$ or similar isotopes are used in the chain reaction some change in the rate of neutron production and consequently some change in the permissible latitude in the amount of impurities or leakage may be encountered. For example, as the reactor herein described proceeds in its operation a quantity of 94 is generated which, being fissionable, takes part in the reaction. Moreover the fission products produced being impurities tend to reduce the K factor but this effect is counteracted to a substantial degree by the neutron output of $94^{239}$ upon fission. After a substantial period of operation of the reactor the K factor may be increased substantially due to the fact that somewhat more neutrons are evolved upon fission of $94^{239}$ than are obtained upon fission of $U^{235}$.

At all events to maintain a self-sustaining chain reaction $Z-(A+B+C+L)$ must be not less than about one.

Where $Z$=number of neutrons produced by fission per neutron.

$A$=fraction of neutrons absorbed other than by fission by any of the isotopes of uranium or thorium. Such absorption may lead to the formation of new bodies fissionable with slow neutrons.

$B$=the number of neutrons absorbed by the moderator per neutron consumed in fission.

$C$=number of neutrons absorbed by other absorbers (impurities or control rods per neutron consumed in fission) and $L$=number of neutrons lost in leakage per neutron consumed in fission.

Z may be ascertained by bombardment of a pure isotope with neutrons of the energies developed in a reactor.

A, B, and C may be computed to approximate values by computing the danger sums basing the computations upon the ratio of neutron capture cross section and concentration of the moderator, nonfissioning isotope or other absorber to that of the fissioning isotope or isotopes in the manner previously described, or may be determined experimentally and L may be determined experimentally.

Preferably the value $Z-(A+B+C+L)$ should not exceed unity by more than the fraction of neutrons evolved which are delayed neutrons which in the case of $U^{233}$ this value is about 0.01.

Since a coolant is a neutron absorber, the amount of coolant within a reactor must be controlled so as to prevent the value C from reaching a value such that the difference between Z and the sum of A, B, C and L becomes less than one. Preferably this value $A+B+C+L$ should be such that the value $Z-(A+B+C+L)$ is not less than about one or more than about 1.01.

During the continued operation of a reatcor in which a graphite moderator is used it has been found that as the operation proceeds the K factor of the reactor increases. This is due to the fact that upon neutron bombardment certain impurities in the graphite, such as boron which are high neutron absorbers, are converted to an isotope which has less tendency to absorb neutrons. Thus continued neutron bombardment of a moderator such as graphite containing an isotope which is a high neutron such as $B^{10}$ absorber reduces the content of this isotope converting it to another isotope of a lower neutron capture cross section such as $B^{11}$. Broadly speaking this process is applicable to the removal of any isotope of high neutron capture cross section present in low concentration for example of the order of one or several parts per million and generally less than 0.1 percent which, upon neutron absorption, is converted to an isotope of lower neutron capture cross section. Such isotopes may be removed from any material such as carbon, $D_2O$ or beryllium which itself has a relatively lower neutron capture cross section.

During the operation of the neutronic reactor particularly at high neutron densities radioactive elements of exceedingly high capture cross section may be formed in the uranium as an intermediate element in the decay chains of fission fragments and this formation will lower the value of the reproduction factor for the system. Radioactive $Xenon^{135}$ is an example of such an intermediate element, this product having a half life of about 9 hours and being formed mostly from radioactive iodine which has a half life of about 6.6 hours and decays to barium. There should be sufficient excess in the reproduction ratio of the reactor so that in the event the reproduction factor is reduced as a result of the formation of an intermediate decay element having a high capture cross section for neutrons the control rods may be withdrawn sufficiently to maintain the reproduction ratio at a value of unity while maintaining the power output at the desired level. It might be desirable to initially construct the reactor sufficiently over-sized to supply this excess reproduction ratio when needed and in this event removable impurities for example in the form of additional shim or control rods may be initially placed in the reactor and kept there at all times until the reproduction ratio commences to fall as the result of the formation of these intermediate decay elements.

While the theory of the nuclear chain fission mechanism in uranium set forth herein is based on the best presently known experimental evidence, we do not wish to be bound thereby, as additional experimental data later discovered may modify the theory disclosed. Any such modification of theory, however, will in no way affect the results to be obtained in the practice of the invention herein described and claimed.

We claim:

1. A neutronic reactor comprising a cubical mass of graphite approximately 25 feet in each dimension, horizontal air channels of approximately 1.75 inches square cross-section extending between opposite faces of said mass in a repetitive square pattern with approximately 7 inches between centers of adjacent channels each of said channels having one of its corners extending downward, 68 cylindrical uranium slugs approximately 1.1 inches in diameter and 4 inches long lying end-to-end centrally of each of the central 700 to 1000 channels in the downwardly extending corner thereof, at least one movable body of cadmium extending inwardly from one of the outer faces, means for selectively positioning said body of cadmium, means for forcing air through said channels from one of said faces to the other of said faces, and a shield of concrete from five to ten feet in thickness surrounding said mass.

2. A neutronically reactive composite assembly suitable for the construction of a neutronic reactor active portion consisting in neutronic essentials of a mass of graphite having parallel air-filled chambers of approximately 1.75 inch square cross-section extending therethrough in a repetitive square pattern with approximately 7 inches between centers of adjacent channels, each of said channels having one of its corners extending downward, and cylindrical uranium slugs approximately 1.1 inches in diameter in the downwardly extending corner of each channel.

3. A neutronic reactor comprising a cubical mass of graphite approximately 25 feet in each dimension, horizontal air channels of approximately 1.75 inches square cross-section extending between opposite sides of said mass in a repetitive square pattern with approximately 7 inches between centers of adjacent channels, each of said channels having one of its corners extending downward, 68 cylindrical uranium slugs approximately 1.1 inches in diameter and 4 inches long lying end-to-end centrally of each of the central 700 to 1000 channels in the downwardly extending corner thereof, at least one movable body of cadmium extending inwardly from one of the outer faces, means for selectively positioning said body of cadmium, a shield around said mass, the walls of said shield being spaced away from each of said faces to form separate chambers connected by said channels, said shield having an air duct connecting one of said chambers to the atmosphere near ground level and a second air duct connecting the outer member to the atmosphere substantially above ground level, and a fan in one of said ducts to create an air flow through said channels and ducts in a direction exhausting said air through said second duct.

References Cited in the file of this patent

UNITED STATES PATENTS

| 2,127,193 | Toulmin | Aug. 16, 1938 |
| 2,161,985 | Szilard | June 13, 1939 |
| 2,708,656 | Fermi et al. | May 17, 1955 |

FOREIGN PATENTS

| 440,023 | Great Britain | Dec. 12, 1935 |
| 114,150 | Australia | May 2, 1940 |
| 861,390 | France | Oct. 28, 1940 |
| 233,011 | Switzerland | Oct. 2, 1944 |

OTHER REFERENCES

Naturwissenschaften, vol. 27, 1937, pp. 402–410.

Power, July 1940, pp. 56–59.

Handbook of Chemistry and Physics, 26th ed., p. 2462, Chemical Rubber Pub. Co. (1942).

Rutherford: "Radioactive Transformations," pp. 204–207, Charles Scribner's Sons (1906).

Smyth: "Atomic Energy for Military Purposes," pp. 103, 104, Aug. 1945.

Kelly et al.: Phy. Rev. 73, 1135–9 (1948).

UNITED STATES PATENT OFFICE
CERTIFICATE OF CORRECTION

Patent No. 2,836,554                                        May 27, 1958

Enrico Fermi et al.

It is hereby certified that error appears in the printed specification of the above numbered patent requiring correction and that the said Letters Patent should read as corrected below.

Column 12, line 61, for "the roof" read -- thereof --; column 13, line 58, for "unused channels" read -- unused air channels --; line 61, for "One the fifth side" read -- On the fifth side --; column 18, line 37, for "packets" read -- jackets --.

Signed and sealed this 13th day of January 1959.

(SEAL)
Attest:

KARL H. AXLINE
Attesting Officer

ROBERT C. WATSON
Commissioner of Patents